United States Patent [19]
Walther et al.

[11] Patent Number: 4,501,406
[45] Date of Patent: Feb. 26, 1985

[54] SHUT-OFF DEVICE FOR A FLUID

[75] Inventors: Helmut Walther; Mario Palazzetti, both of Turin, Italy

[73] Assignee: Centro Ricerche Fiat S.p.a., Turin, Italy

[21] Appl. No.: 513,918

[22] Filed: Jul. 14, 1983

[30] Foreign Application Priority Data

Jul. 15, 1982 [IT] Italy .............................. 67899 A/82

[51] Int. Cl.[3] ............................................. F16K 31/12
[52] U.S. Cl. ...................................... 251/30; 251/129; 239/585; 239/102
[58] Field of Search ........................... 251/30, 29, 129; 239/102, 585

[56] References Cited

U.S. PATENT DOCUMENTS

| | | | |
|---|---|---|---|
| 1,279,027 | 9/1918 | Simmon et al. | 251/30 |
| 2,902,251 | 9/1959 | Oncley | 251/129 |
| 3,465,732 | 9/1969 | Kattchee | 251/129 |
| 4,022,166 | 5/1977 | Bart | 251/129 |
| 4,298,181 | 11/1981 | Corrado et al. | 251/129 |

FOREIGN PATENT DOCUMENTS

| | | | |
|---|---|---|---|
| 2918377 | 11/1980 | Fed. Rep. of Germany | 251/129 |
| 50010 | 4/1977 | Japan | 251/129 |

*Primary Examiner*—James C. Yeung
*Attorney, Agent, or Firm*—Albert L. Jeffers

[57] ABSTRACT

A shutoff device for a fluid with a body having a conduit in which, in use, the fluid flows, a plunger arranged slidingly in a seat formed in the body and provided with an end portion suited to shut off said conduit, and means controlling the movement of the plunger into said seat. The control means comprise at least in particular a member having a hollow shape, made in piezoelectric material and arranged inside a chamber formed in the body and communicating with part of the surface of said plunger. Into the chamber is contained a liquid which is subjected to pressure changes as a consequence of the volume changes induced in the piezoelectric member; said liquid causes the movement of the plunger and consequently the shutoff of the conduit.

18 Claims, 3 Drawing Figures

SHUT-OFF DEVICE FOR A FLUID

BACKGROUND OF THE INVENTION

The present invention relates to a shutoff device for a fluid. Particularly, the present invention relates to a device of the type comprising a body having a conduit in which, in use, a fluid is adapted to flow, a plunger sliding in a seat formed in said body and provided with an end portion suited to shut off said conduit, and means controlling the movement of the plunger into the seat between a first and a second working positions in which the above-mentioned end portion shuts and opens the conduit respectively.

Shutoff devices of the above specified type are differently used for various purposes: for instance, they are used as servovalves of the proportional or on-off type, or as injectors of a fuel in the field of the endothermic engines. In particular, in order to increase the efficiency of the engines, especially of the diesel type engines, different solutions have been studied relating to the injection, especially in connection with the increase of the injection pressure, the reduction of the injection time and, in general, the improving of the control in every stage. In this connection, studies are known in which it is provided the use of control means for the movement of the plunger: in particular, it is known an embodiment of an injector which makes use as actuator for the movement of the plunger of a member made in piezoelectric material and having the shape of a cylinder. Such an actuator is known only on an experimental basis and presents certain drawbacks that have not allowed the production on an industrial scale. As a matter of fact, the piezoelectric cylinder presents the risk of depolarization in the event that in operation be exceeded a critical pressure level; further, said cylinder has a coefficient of cubical expansion rather low and in use must be enclosed inside a cylindric expansible container.

SUMMARY OF THE INVENTION

An object of the present invention is to realize a shutoff device for a fluid, which obviates the drawbacks of the above-mentioned and known devices.

This object is attained by the present invention in that it relates to a shutoff device for a fluid, with a body having a conduit in which said fluid is adapted to flow, a plunger sliding in a seat formed in said body and provided with an end portion suited to shut off said conduit, and means controlling the movement of said plunger into said seat between a first and a second working positions in which said end portion shuts and opens said conduit; said device being characterized in that said means controlling the movement of the plunger comprise at least a member with a substantially hollow shape, made in piezoelectric material and arranged inside a chamber formed in said body, communicates with a radial portion of the surface of said plunger and contains a liquid that laps also on said radial portion of surface of said plunger; the internal and external surfaces of said piezoelectric member being coated with a layer of electrically conductive material and connected with corresponding power supply terminals arranged inside said body.

BRIEF DESCRIPTION OF THE DRAWINGS

For a better understanding of the present invention there will be now described some embodiments only as non limiting examples and with reference to the accompanying drawings, in which.

DETAILED DESCRIPTION OF THE INVENTION

Figure 1:
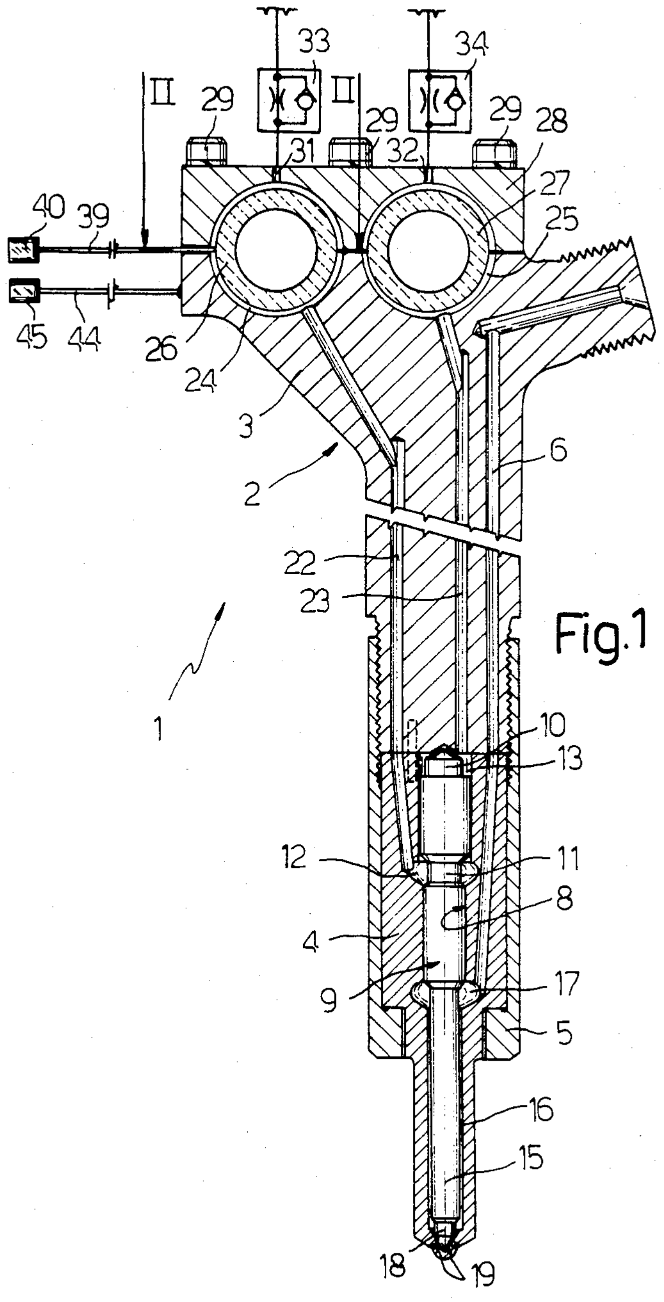
FIG. 1 is a view in elevation and in section of a first embodiment of a device according to the present invention.

Referring in particular to FIG. 1, it is referenced in general with 1 a shutoff device for a fluid realized according to the present invention and comprising substantially a body divided in an upper portion 3 and a lower portion 4 connected through a tubular member 5 internally threaded and having on the inside a conduit 6 in which, in use, flows the fluid that it is desired to shut off. The lower portion 4 of the body 2 is axially bored so as to form a cylindric seat 8 into which is sliding a plunger 9. In the part facing the upper portion 3, the plunger 9 has a head 10 with a reduced diameter and a groove 11, which determine, in combination with the cylindric seat 8, two respective annular chambers 13, 12. On the opposite side of the head 10, the plunger 9 further presents an end spindle 15 which forms with the opposite lower portion 4 of the body 2 a gap 16 communicating upstream with the conduit 6 through an annular chamber 17. On the side opposite to the chamber 17, the spindle presents a needle head 18 suited to close the through holes 19 formed in the portion 4.

According to the present invention, chambers 12 and 13 are connected, by means of respective conduits 22, 23, with respective spheric chambers 24, 25 realized in the part of head of portion 3 and containing each a respective member 26, 27 having the shape of a spheric shell and made in piezoelectric material. More in details, each chamber 24, 25 is formed combining two hemispheric seats, the first of which is formed in a lid 28 fixed to portion 3 by means of bolts 29. In register with each chamber 24, 25, the lid 28 presents two respective vents 31, 32, that are connected with the outside through valves 33, 34 of known type.

Figure 2:
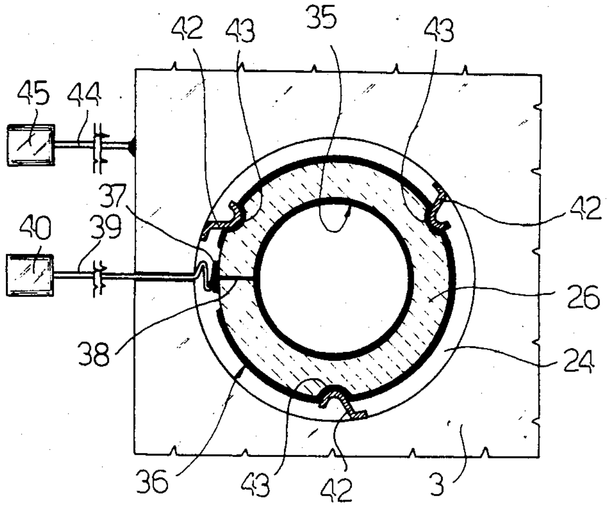
FIG. 2 is a section, in enlarged scale, along the lines II—II of FIG. 1.

Referring in particular to FIG. 2, it can be noted that the piezoelectric member 26 presents both inside and outside a coating respectively 35, 36 made from conducting material. With more details, the inner coating 35 is connected with a conducting area 37 situated on the external surface of member 26 by means of a radial conducting portion 38. To the area 37 is connected the end of an electric cable 39, which on the opposite side is connected to a respective electric connector 40. The conducting external coating 36 is obviously interrupted correspondingly with the conducting area 37 and is electrically supplied by means of appropriate conducting springs 42 having an end welded to the portion 3 and an opposite end which is shaped as a hook and engages a corresponding recess 43 formed in the external surface of the member 26. In this way, the springs 42 have simultaneously the function of electric supply of the external coating 36 and of positioning of the piezoelectric member 26 into the respective chamber 24. The electric connection of the coating 36 toward the exterior is obtained by means of an electric cable 44 having an end welded to the portion 3 and an opposite end connected with a connector 45.

Figure 3:
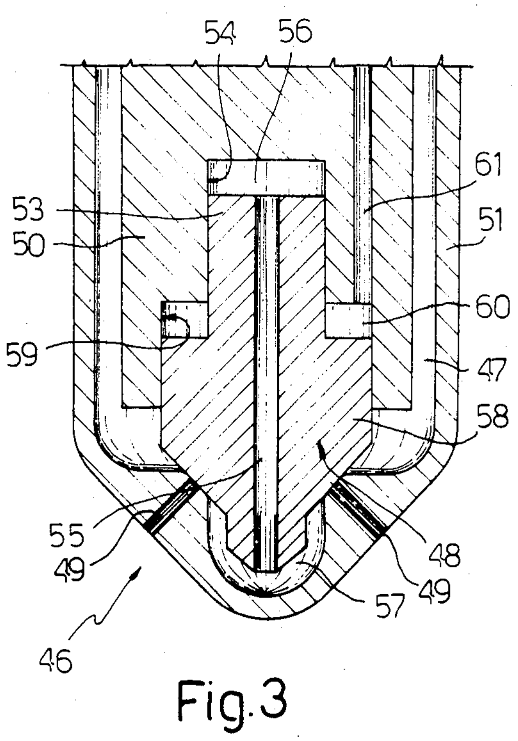
FIG. 3 is a view in elevation and in section of a detail relating to a second embodiment of a device according to the present invention.

Referring to FIG. 3, it is referenced in general with 46 the terminal portion of a shutoff device (not completely illustrated) realized according to the teachings of the present invention. In particular, comparing said terminal portion 46 with the one described with reference to FIG. 1, there can be found respectively a gap 47 through which arrives the fluid to be shut off, a plunger 48 which has the function of a shutoff member, and through holes 49 similar to the holes 19 of FIG. 1. The gap 47 is delimited by the opposite walls of a cylindric inner body 50 and of a tubular outer body 51, at the end of which are formed the said holes 49.

The plunger 48 presents a spindle 53 having a reduced cross-section, which slides in a cylindric seat 54 formed into the body 50, and presents further a through axial bore 55 that communicates an upper chamber 56, delimited by the surface of the head of the spindle 53 and by the facing surfaces of the body 50, with a lower chamber 57 which in use receives the fluid coming from the gap 47 and flowing toward the through holes 49. The plunger 48 presents further a head 58 extending from the spindle 53 and sliding in a respective seat 59 presented by the body 50 so as to form with the latter an annular chamber 60. This chamber is connected, through a conduit 61, with a corresponding chamber into which is arranged a piezoelectric actuator member shaped as a spheric shell (not illustrated) quite similar, for instance, to the member 26 described with reference to FIG. 2.

The operation of device 1 takes place in a rather simple and obvious way. Indeed, in use, to the conduit 6 is supplied the pressurized fluid that is intended to be shut off, while into the conduits 22, 23 and into the chambers 12, 13 and 24, 25 it is introduced the control fluid, which can also be of the same type as the fluid to be shut off. For instance, in the event that the device 1 is used as an injector, said fluid could be diesel fuel. Feeding therefore each of the piezoelectric members 26, 27 with a suitable direct voltage, in each of them it will be induced a volume change which is converted in a pressure change of the control liquid contained into the conduits 22, 23, producing consequently an axial translation of the plunger 9. By combining properly the values of the voltages applied to each of the piezoelectric members 26, 27, it will result possible shut off or allow a free flow of the fluid coming from the conduit 6 and going toward the holes 19.

Similarly to what described with reference to FIGS. 1 and 2, in FIG. 3 the shutoff of the fluid is obtained by means of the plunger 48, the axial translations of which are obtained acting, through said piezoelectric member, on the level of the pressure inside the annular chamber 60. In this case, it will be noted that, owing to the through bore 55 communicating the opposite ends in the axial direction of the plunger 48, this latter results hydraulically balanced and therefore needs a pressure conveniently reduced to move from the closed position to the open position.

From an examination of the features of the devices realized according to the present invention it can be noted that they allow the achievement of the above-mentioned objects. As a matter of fact, the use of an actuator member of the piezoelectric type with the shape of a spheric shell, does not present in practice any restriction of a mechanical nature such as to cause the depolarization of the material, in that the mechanical compression of the spheric actuator (or anyhow hollow) does not produce a mechanical disorientation of the dipoles, which generate the piezoelectric effect through an orientation. Furthermore, said type of actuator allows to obtain very substantial advantages in connection with the coefficient of cubical expansion and does not require a special container, so that it can work freely plunged into the control liquid, provided that the piezoelectric material used is not permeable.

It is also clear that changes and modifications can be made to the above described embodiments of the shutoff devices without departing from the scope of the present invention.

For instance, wide modification can be made to the system described in FIG. 2 for the electric connection of the inner and outer coatings. Furthermore, each of the piezoelectric member 26, 27 could be conveniently made from several layers of piezoelectric material superimposed each other with interposition of a conductive layer and duly connected in order to allow the electric supply of each of them. In this case there would be the advantage of obtaining the same electric field with levels of feeding voltage strongly reduced compared with those required in the illustrated example.

According to a further embodiment, each of the piezoelectric members 26, 27, could present a structure different from that above described as a spheric shell, provided it presents in any case a recess.

Finally, the interior of each member 26, 27 could be filled rather than with air, with any gas or with a proper material capable of being elastically deformed, for instance of the foamed type with closed cells, or also it could be formed a vacuum.

We claim:

1. A fluid shut off device (1) including a body, (2) said body having a conduit (6) in which a fluid is adapted to flow, a cylindrical plunger (9) slideably received in a seat (8) formed in said body (2) said plunger having an end portion (15) adapted to close said conduit (6), and control means for controlling the movement of said plunger (9) in said seat (8) between first and second working positions in which said end portion (15) respectively closes and opens said conduit (6); said control means comprising: a chamber formed in said body; said plunger having a radial portion of reduced diameter; a conduit in said body; at least one hollow piezoelectric member having an internal and external surface (26) said member operably disposed inside said chamber (24) to communicate with said radial portion of said plunger (9) by means of said conduit, said fluid cooperating with said radial portion of said plunger (9) to displace said plunger axially within said body; said internal and external surfaces of said piezoelectric member (26) respectively having coatings (35) of electrically conducting material thereon and said coatings connected to corresponding power supply terminals (40,55) arranged outside said body (2).

2. A device according to claim 1, characterized in that said hollow member (26) contains a gaseous fluid.

3. A device according to claim 2, characterized in that said gaseous fluid is air.

4. A device according to claim 1, characterized in that said hollow member (26) contains an elastically compressible material.

5. A device according to claim 4, characterized in that said compressible material is of the foamed type with closed cells.

6. A device according to claim 1, characterized in that said conductive coating on the inner surface of said hollow member (26) is electrically connected with a conducting area (37) on the external surface of said member (26,27) and electrically insulated from said coating (36) exteriorly said member (26,27).

7. A device according to claim 1,
characterized in that said chamber (24) contains elastically deformable means for supporting said piezoelectric member (26).

8. A device according to claim 7,
characterized in that said elastically deformable means comprises a spring (42) constructed of an electrically conducting material.

9. A device according to claim 8,
characterized in that said spring (42) has an end fixed to said body (2) and an opposite end cooperating with a seat (43) formed on the external surface of said piezoelectric member (26) so as to establish between said body (2) and said member (26,27) both a mechanical restraint and an electrical connection.

10. A device according to claim 1,
characterized in that said chamber (24) in which said piezoelectric member (26,27) is arranged, communicates with the exterior of said body (2) through a vent conduit (31) and a hydraulic valve (33).

11. A device according to claim 1,
characterized in that two chambers (24,25) and two piezoelectric members are provided and that said plunger (9) comprises a head (10) with a reduced cross-section and, in a central position, an annular groove (11) delimiting with said body (2) two respective annular chambers (12,13), each of which respectively communicates with one of said chambers (24,25) into which said piezoelectric members (26) are arranged.

12. A device according to claim 11, characterized in that said chambers (24,25) are delimited by facing surfaces of said body (2) and of a shaped lid (28) connected thereto.

13. A device according to claim 12, characterized in that said chambers (24,25) are spherically shaped.

14. A device according to claim 1,
characterized in that said plunger (48) comprises two portions (53,58) each portion having a respective different diameter which define with said body (50) an annular chamber (60) connected with said chamber (24) and wherein the opposite axial ends of said plunger (48) communicate with each other by means of a bore (55) extending through said plunger.

15. A device according to claim 1,
characterized in that said hollow piezoelectric member (26) comprises a spherical shell.

16. A device according to claim 1,
characterized in that said hollow member (26) comprises a plurality of layers of piezoelectric material, between each of which is interposed a layer of conducting material connected to the exterior with corresponding power supply terminals.

17. A device according to claim 1,
characterized in that said fluid is a fuel.

18. The device according to claim 1 wherein the interior of said hollow member is exhausted of fluid to generate a vacuum.

* * * * *